Figure 1:
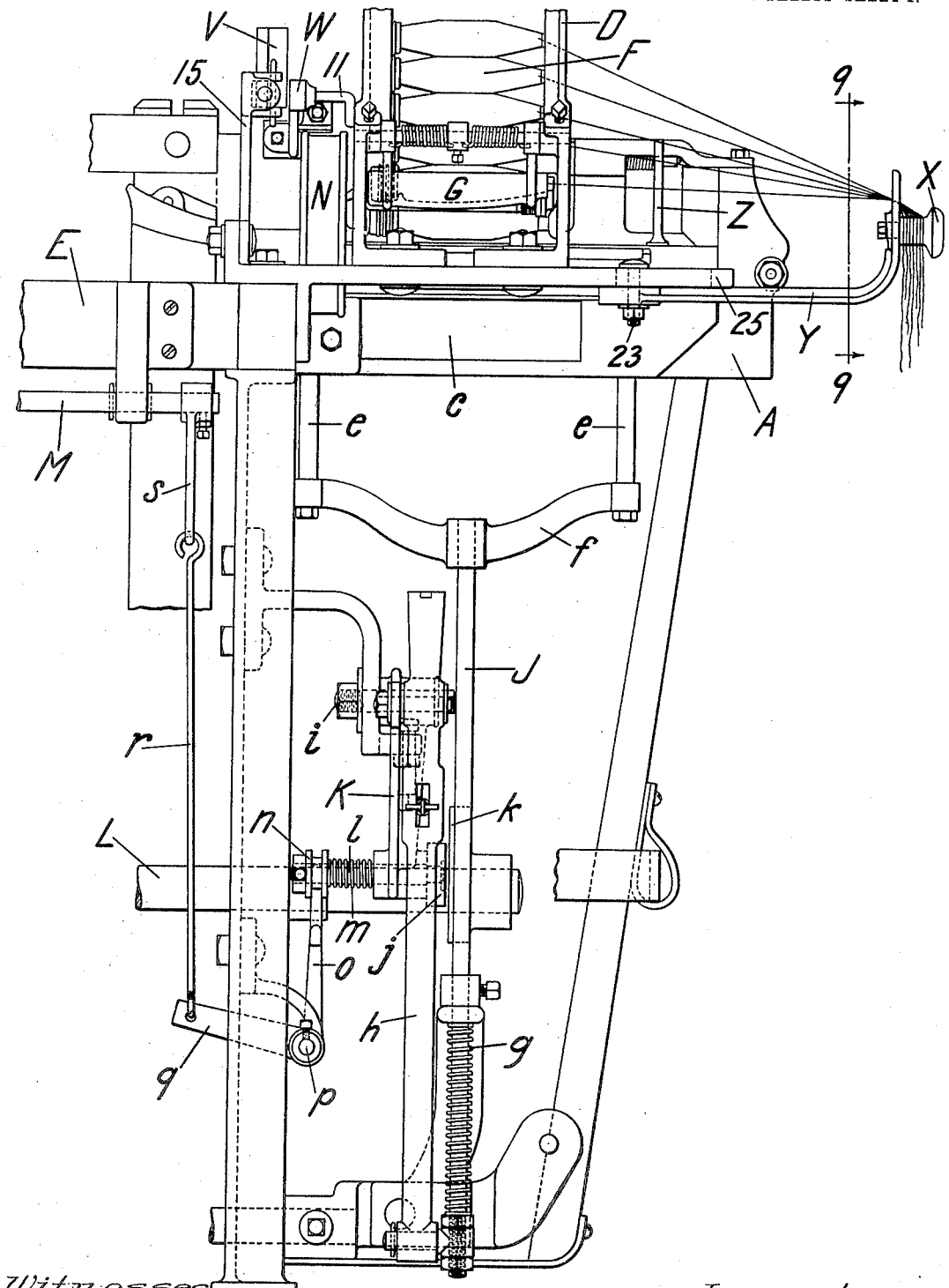

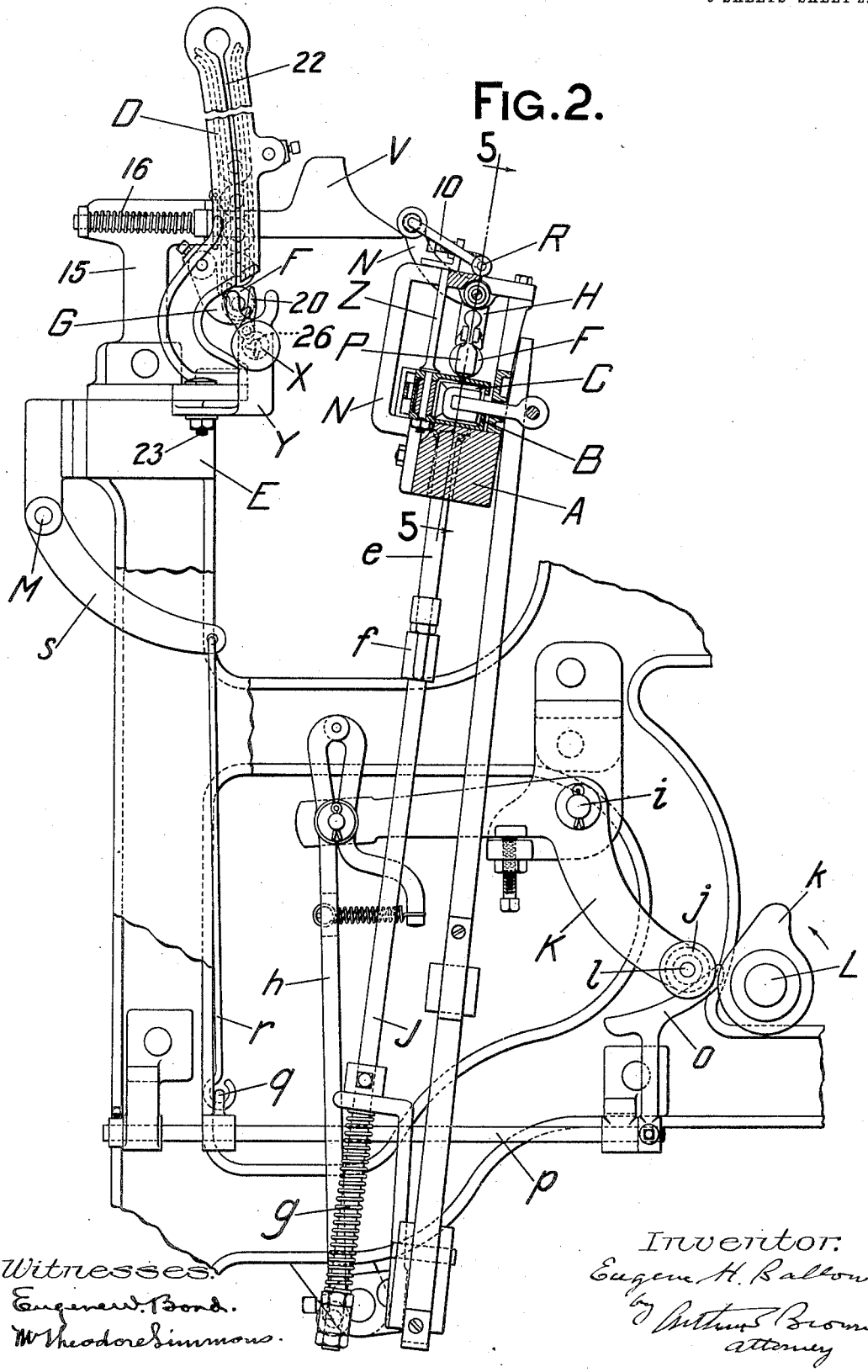

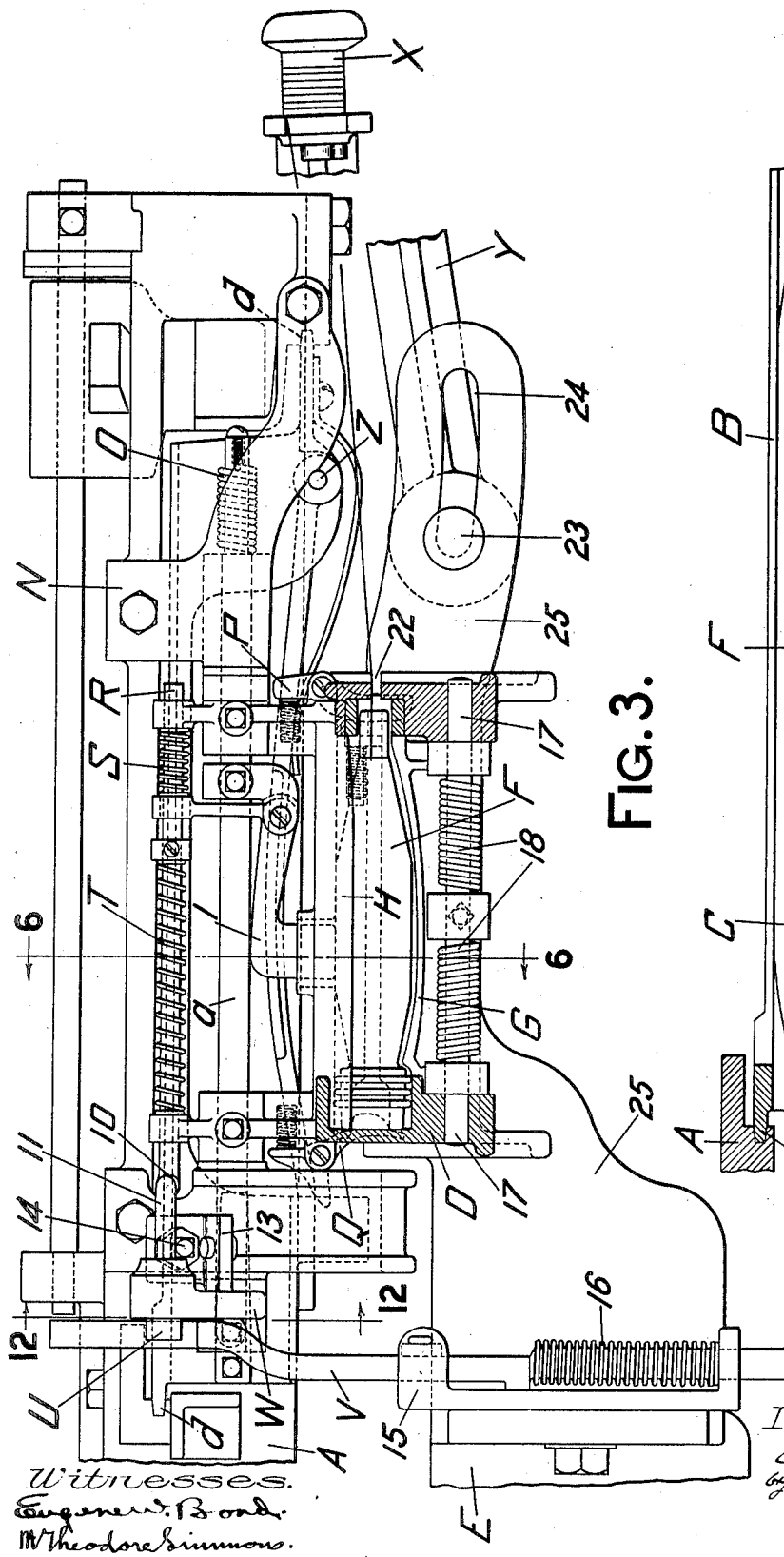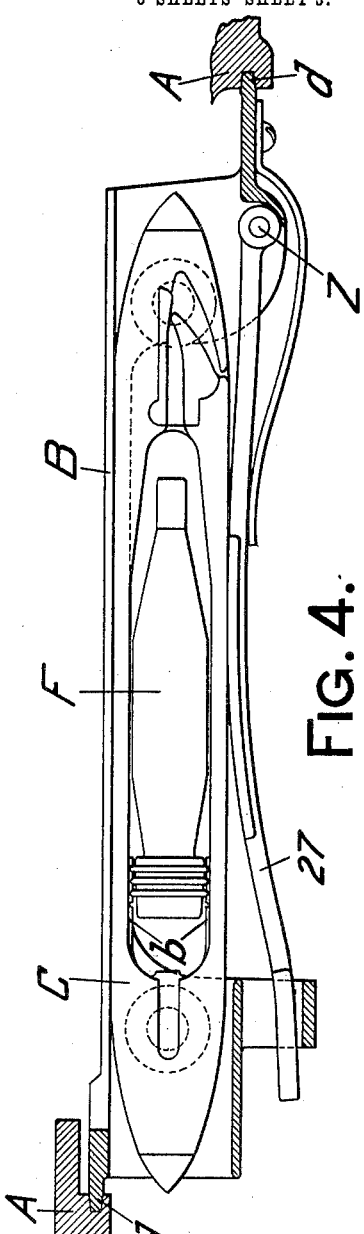

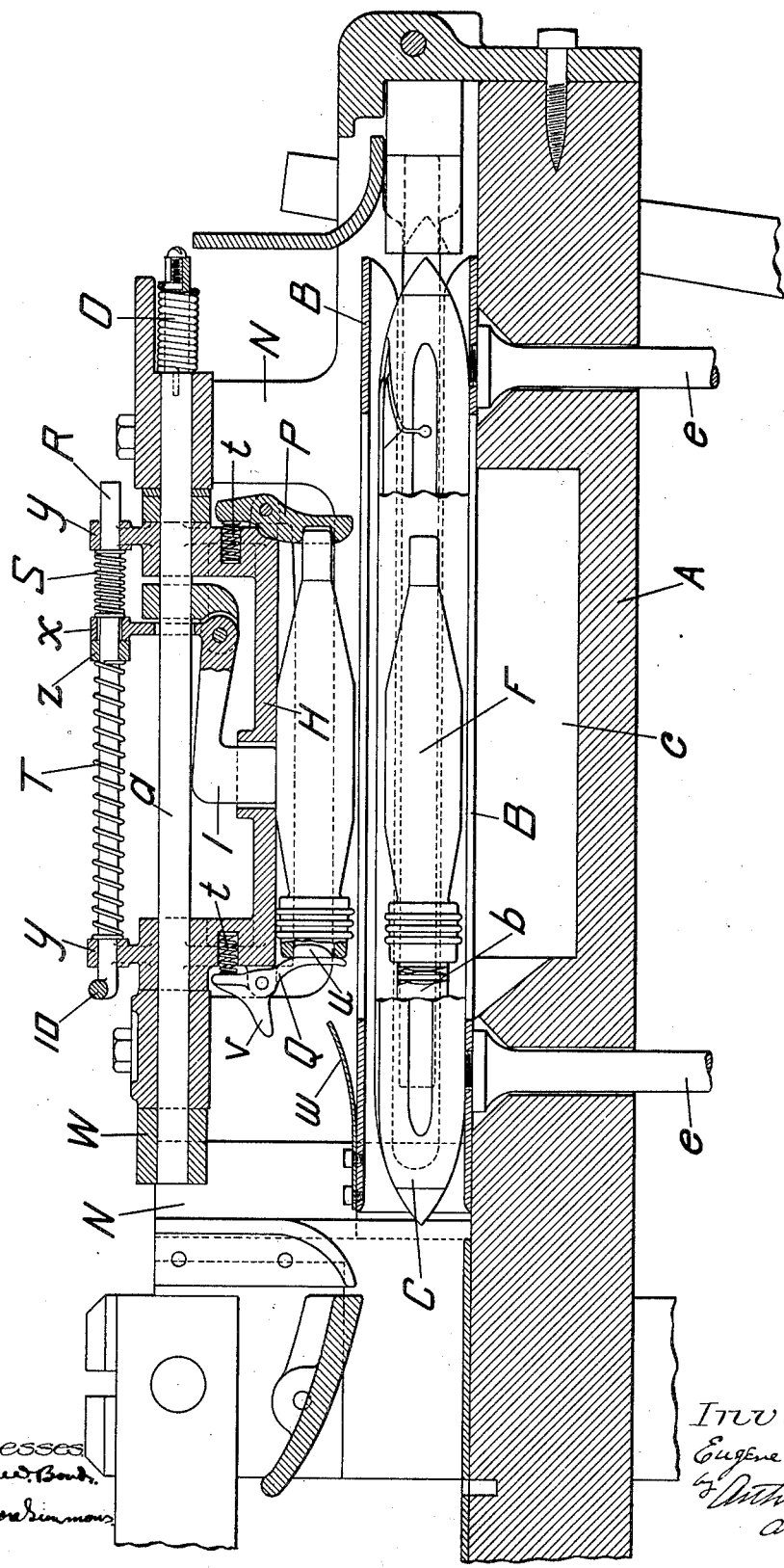

E. H. BALLOU.
WEFT REPLENISHING LOOM.
APPLICATION FILED OCT. 18, 1912.

1,082,390.

Patented Dec. 23, 1913.
6 SHEETS—SHEET 5.

Witnesses.

Inventor:
Eugene H. Ballou
by Arthur Browne
Attorney

E. H. BALLOU.
WEFT REPLENISHING LOOM.
APPLICATION FILED OCT. 18, 1912.

1,082,390.

Patented Dec. 23, 1913.
6 SHEETS—SHEET 6.

Witnesses.
Eugene D. Bond.
W. Theodore Simmons.

Inventor:
Eugene H. Ballow
by Arthur T. Browne
Attorney

UNITED STATES PATENT OFFICE.

EUGENE H. BALLOU, OF PAWTUCKET, RHODE ISLAND, ASSIGNOR TO DRAPER COMPANY, OF HOPEDALE, MASSACHUSETTS, A CORPORATION OF MAINE.

WEFT-REPLENISHING LOOM.

1,082,390.    Specification of Letters Patent.    Patented Dec. 23, 1913.

Continuation in part of application Serial No. 673,977, filed January 29, 1912. This application filed October 18, 1912. Serial No. 726,475.

*To all whom it may concern:*

Be it known that I, EUGENE H. BALLOU, of Pawtucket, in the county of Providence and State of Rhode Island, have invented certain new and useful Improvements in Weft-Replenishing Looms, of which the following is a specification.

The present application is a continuation in part of my prior application for Letters Patent of United States, Serial No. 673,977, filed January 29, 1912.

The present invention relates to that class of weft-replenishing looms in which the replenishment is effected automatically when needed by the ejection of the depleted weft-carrier from the running shuttle and the insertion of a filled weft-carrier, this class being typified by United States Letters Patent of Northrop, No. 529,940, November 27, 1894. In accordance with the customary organization of such looms, the magazine containing filled weft-carriers is mounted upon a stationary part of the loom independent of the lay and the weft-replenishment is effected by transferring a filled weft-carrier from the magazine to the shuttle in the neighboring shuttle-box on the lay while the loom is running at full speed. The usual practice is to have the transfer take place while the lay is approaching front center (that is to say, at the time when the lay is about to change its direction of reciprocation at the front of the loom) and the transfer has to be made with great rapidity and by the exercise of a substantial force. The consequence is that weft-carriers are frequently damaged during the transfer, especially since the shuttle is not always in the exact proper position to receive the filled weft-carrier, and longitudinal movement of the shuttle, or of the weft-carrier, or of both may be required during the transferring action.

The primary object of the present invention is to increase the time involved in the transfer and thereby to make the transfer easy and to avoid damage to the weft-carriers. In carrying out this object, the lay itself carries a spare filled weft-carrier in close proximity to the shuttle-box at the replenishing side of the loom, and when weft-replenishment is called for (through the action of any of the well-known weft-detectors employed for that purpose), this weft-carrier is transferred to the shuttle and the depleted weft-carrier is concurrently ejected. At a succeeding beat of the lay a filled weft-carrier is supplied to the lay in readiness for the next transfer, being automatically taken from a magazine containing a large number of filled weft-carriers, this magazine being mounted on a stationary part of the loom and independent of the lay. Since the spare filled weft-carrier itself is immediately transferred to the shuttle and is carried by the lay itself, substantially all of the time is available for the transfer during which the shuttle occupies the shuttle-box at the replenishing side of the loom. In fast running looms this period is equal (substantially) to the last half of the forward beat of the lay and the first half of its retreat and affords ample time for a smooth and easy transfer. The transfer of a filled weft-carrier from the magazine to the lay is not concurrent with the transfer of the filled weft-carrier from the lay to the shuttle but takes place at a succeeding beat of the lay and hence ample time is allowed therefor. In accordance with the present improvements this transfer from the magazine to the lay occurs at the forward beat of the lay next following the transfer to the shuttle and when the shuttle is at the other side of the loom; so that there is always a filled weft-carrier on the lay whenever the shuttle is at the replenishing or magazine side of the loom. Hence, if two changes are called for in immediate succession, there is always a filled weft-carrier on the lay ready for insertion in the shuttle.

So much of a loom embodying the present invention as is necessary for an understanding thereof is illustrated in the accompanying drawings, wherein—

Figure 6:
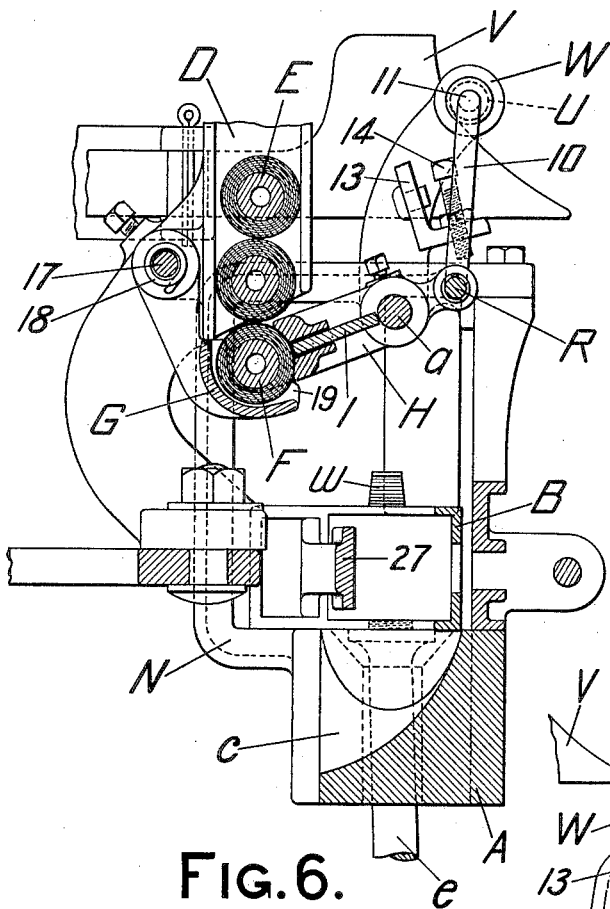
Figure 7:
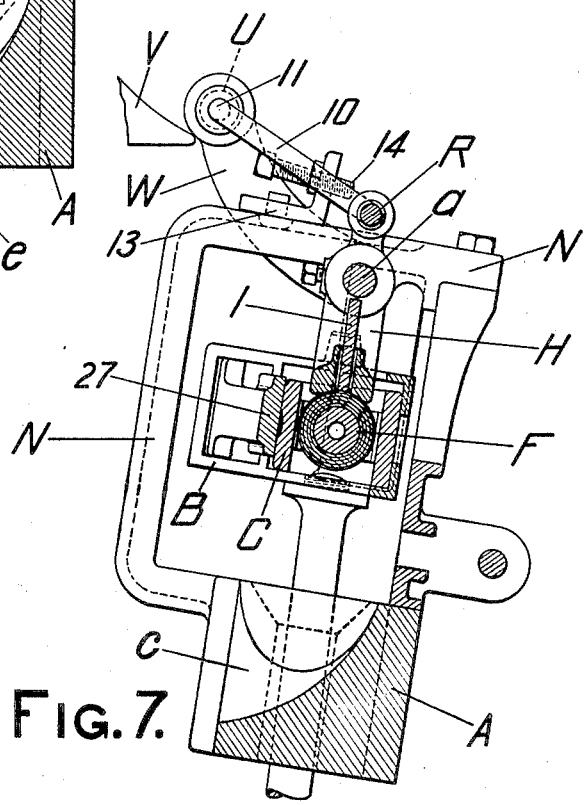
Figures 8, 9:
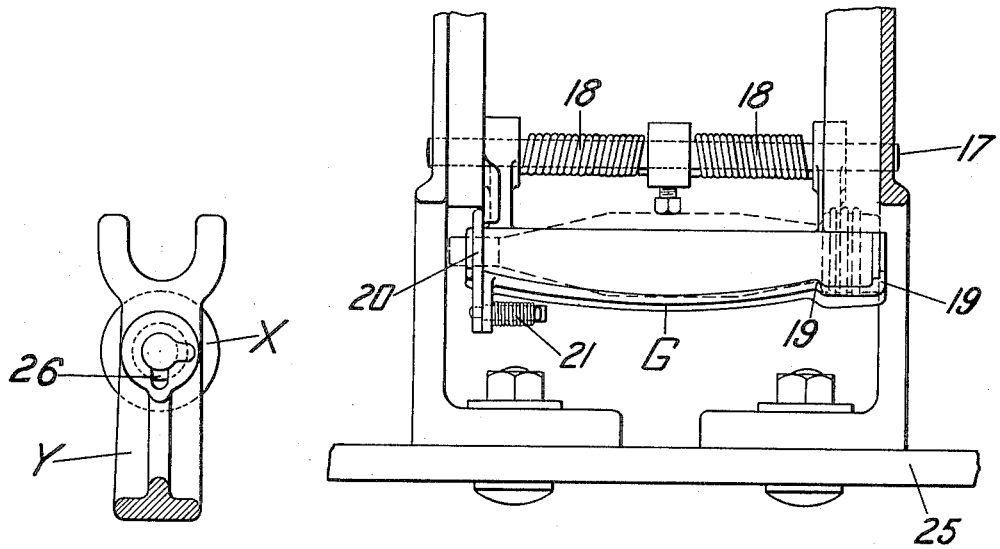

Figure 1, is a front view of the replenishing side of the loom. Fig. 2, is a side view of the front part of the replenishing side of the loom, the lay being shown in section. Fig. 3, is a plan view of the parts shown in Fig. 1, the magazine being shown in section. Fig. 4, is a horizontal section of the shifting shuttle-box. Fig. 5, is a vertical section of the lay at the replenishing side of the loom. Fig. 6, is cross section of the lay, and of the lower end of the magazine. Fig. 7, is a cross section of the lay. Fig. 8, is a rear view of the lower part of the magazine.

Figure 10:
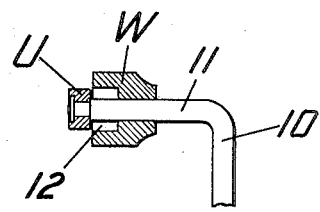
Figure 11:
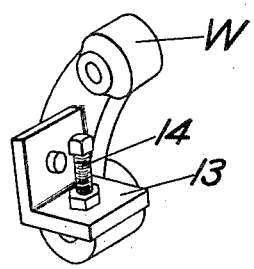
Figures 12, 13:
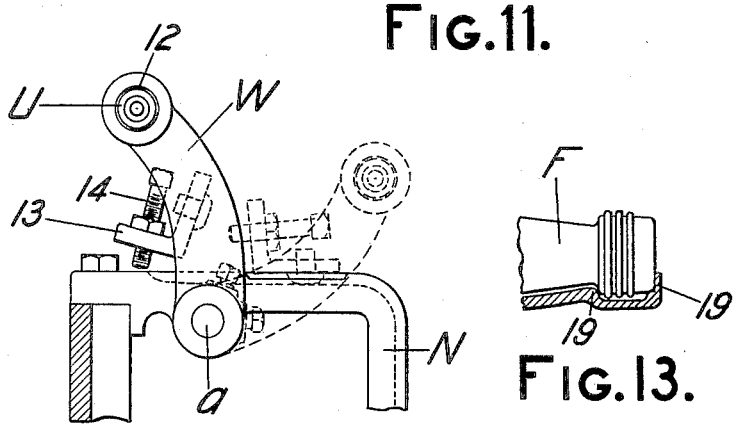

Fig. 9, is a section in the plane indicated by the line 9—9, in Fig. 1. Figs. 10, and 11, are detail views of an arm of the weft-carrier holder on the lay. Fig. 12, is a section in the plane indicated by the line 12—12, in Fig. 3. Fig. 13, is a detail section of the magazine shelf.

In the drawings, A, is the lay; B, is the shuttle-box on the lay at the replenishing or magazine side of the loom; C, is the shuttle; D, is the magazine, independent of the lay, mounted on the breast-beam E, of the loom; and F, F, F, are weft-carriers.

The illustrated magazine is a stationary vertical hopper containing a stack of filled weft-carriers which feed downwardly by gravity, and the lowermost weft-carrier rests on a shelf G, at the bottom of the magazine which shelf is open toward the shuttle-box so that said lowermost weft-carrier is ready for transfer to the lay.

The lay itself carries a weft-carrier holder H, which is located immediately above the shuttle-box and holds its filled weft-carrier immediately above the path of the shuttle as it enters and is driven from the box. Accordingly, when the shuttle is in the shuttle-box B, as shown in Fig. 5, the filled weft-carrier within the holder H, mounted on the lay is just above the weft-carrier in the shuttle. Accordingly, the movement necessary to transfer the filled weft-carrier from the holder to the shuttle is of minimum range.

The transfer of the weft-carrier from the holder H, to the shuttle is effected by a relative movement between said holder and the shuttle-box B. As shown, this relative movement is effected by raising and lowering the shuttle-box. To this end, the shuttle-box is mounted to slide up and down in a manner similar to that employed for shifting boxes in drop box looms, which enables well-known and tried lifting mechanism to be employed. The movement of the shuttle-box is governed from a weft-detector which detects the condition of the weft in the shuttle and thereupon initiates the weft-replenishing action. Such weft-detectors are now so well known as to require no detailed description. The weft-detector may be a weft-fork which detects the complete exhaustion or breaking of the running weft, as in the aforesaid Northrop Patent, No. 529,940, or it may be a "feeler" which detects the approaching exhaustion of the running weft (as in United States Letters Patent of Northrop, No. 911,672, February 9, 1909) so that the replenishment can be completed and the depleted weft-carrier can be ejected while still retaining some weft, thus avoiding absent or partial picks in the cloth. Whatever weft-detector is used, when the condition of the running weft is such as to call for replenishment, the shuttle box lifting mechanism is put into action, thereby lifting the shuttle-box so as to inclose within the shuttle chamber the filled weft-carrier held by the holder H. The holder H, firmly sustains the filled weft-carrier from vertical movement and, consequently, as the shuttle-box rises the depleted weft-carrier within the shuttle encounters the filled weft-carrier in the holder and is ejected downwardly from the shuttle, the filled weft-carrier taking its place. Fig. 7, shows the shuttle-box elevated and in the act of taking the weft-carrier from the holder. When the shuttle-box again descends to its normal working position, it carries with it the filled weft-carrier, stripping it from the holder H. The timing of the mechanism intermediate between the shuttle-box B, and the weft-detector which detects the need for weft-replenishment is such that the shuttle is in the shuttle-box B, at the replenishing side of the loom prior to the lifting movement of the shuttle-box; and the shuttle-box resumes its normal position with the filled weft-carrier within the shuttle before the shuttle is again picked to the other or detecting side of the loom. The transfer of the filled weft-carrier from the holder H, to the shuttle in the box B, is followed by a transfer of the bottom weft-carrier in the magazine D, to the holder H. This transfer is effected at the next succeeding beat of the lay when the shuttle is at the other or detecting side of the loom.

The holder H, is pivotally mounted on the lay at a, (as shown in Figs. 3, 5, 6 and 7,) and during the normal running of the loom it occupies its own normal position (shown in Figs. 2, 5 and 7,) holding the filled weft-carrier immediately above the neighboring shuttle-box in readiness for transfer to the shuttle. When, however, the filled weft-carrier has been transferred from the holder into the shuttle, the holder swings upwardly and away from the shuttle-box and forwardly toward the magazine, (as shown in Figs. 3, and 6). This change of position of the holder occurs after the transfer of its weft-carrier to the shuttle has been accomplished and brings the holder into coöperative register with the filled weft-carrier held by the shelf G, at the bottom of the magazine. Accordingly, when the lay next swings forward following the transfer to the shuttle the empty holder takes the filled weft-carrier from the magazine shelf. Figs. 3, and 6, show the holder in the act of taking a weft-carrier from the magazine. During the next retreat or backward movement of the lay, the holder H, resumes its normal position on the lay and places the filled weft-carrier taken by it from the magazine in correct position on the lay with respect to the shuttle-box B. This action of the holder is completed before the shuttle again reaches the shuttle-box B, so that the freshly obtained filled weft-carrier is ready in the holder for immediate transfer to the shuttle, if needful.

The change in position of the holder from its normal position where it sustains a spare filled weft-carrier in proper relation to the neighboring shuttle-box to its abnormal position where it is supplied with a fresh filled weft-carrier from the magazine is instituted by means of a weft-carrier detector I, (Figs. 5 and 6) which is mounted on the holder. This detector I, is directly acted upon by the filled weft-carriers. A filled weft-carrier in the holder is in contact with the detector I, and holds it out of action. When, however, the weft-carrier is transferred from the holder to the shuttle, the detector I, is no longer restrained by it and hence it moves to its active position. This movement of the detector I, into active position results in bringing the holder into coöperation with mechanism which causes it to swing upwardly and to thereby change its position so as to be in coöperative register with the weft-carrier on the bottom shelf of the magazine. Hence, the movement of the weft-carrier holder H, is dependent upon the transfer of the weft-carrier held by it to the shuttle; and the weft-carrier holder cannot change its position on the lay so long as it holds a filled weft-carrier in transferring position on the lay.

The shuttle C, is an automatically threading shuttle having spring jaws $b$, (Figs. 4 and 5) for holding a weft-carrier such as is commonly employed in this class of looms, as indicated in the drawings. This character of shuttle is typified in the United States Letters Patent of Northrop, No. 454,807, June 23, 1891.

The lay is suitably recessed at $c$, below the shuttle-box B, as customary for the downward passage of the depleted weft-carriers ejected from the shuttle.

A complete understanding of the improvements in their illustrated embodiment involves a consideration of all of the mechanical instrumentalities which coöperate with the shuttle-box, weft-carrier holder and magazine to bring about the described action. Accordingly, there will be described, first, the instrumentalities whereby the shuttle-box is lifted whenever the condition of the running weft within the shuttle calls for replenishment; second, the details of the weft-carrier holder H, and of the detector I, and the coöperating devices which change the position of the weft-carrier holder on the lay; third, the construction of the bottom shelf G, of the magazine which enables the weft-carrier holder on the lay to take a weft-carrier therefrom; and finally, the devices which are employed to hold on to the ends of the weft-threads of the filled weft-carriers, both of that in the weft-carrier holder on the lay and of those in the magazine, and which prevent interference with said threads by the rise and fall of the shuttle-box, the purpose of this holding of the weft-ends being, as usual, to enable the weft to be laid in the shed during the first flight of the shuttle with a filled weft-carrier.

The shuttle-box B, is mounted to slide vertically on the lay in a manner common in box looms. The box is guided on the lay as shown at $d$, in Fig. 4, and has downwardly extending guide rods $e, e$, which are connected by a yoke $f$, (Fig. 1) to a lifting rod J. The rod J, is slidingly connected at its lower end to the lay rocker and is acted upon by a depressing spring $g$, which holds said rod down and restores it to its lowermost position after each lift. The lower end of the rod J, is connected to the front end of a lifting lever K, by means of a "give-way" connection $h$, of a usual construction which yields in case of any obstruction (such as a misplaced shuttle or weft-carrier), thus preventing damage. The lifting lever K, is pivoted at $i$, to the loom frame, and at its rear end has a laterally shiftable cam follower consisting of a roll $j$, which coöperates with a cam $k$, on the low or cam-shaft L, of the loom. Ordinarily, the follower $j$, is out of reach of the cam $k$, but, when weft-replenishment is demanded, the follower is shifted into the path of the cam, and, therefore, lever K, is swung, rod J, with the shuttle-box B, is lifted and the shuttle gets a filled weft-carrier. The follower $j$, is carried at the outer end of a spindle $l$, (Fig. 1) slidingly mounted in the lever K, and a spring $m$, normally keeps the spindle in its inner position with the follower $j$, out of the path of the cam $k$, as shown in Fig. 1. At its inner end the spindle $l$, carries a grooved collar $n$, which is engaged by a shifter $o$, on the rear end of a rock shaft $p$, as shown in Figs. 1, and 2. Near its forward end the shaft $p$, has a crank arm $q$, which is connected by a link $r$, to a crank arm $s$, on the change shaft M. This change shaft M, is rocked in a now well-known manner by connections with the weft-detector which ascertains the need of weft-replenishment; and it corresponds with the shaft $d'$, of the aforesaid Northrop Patent No. 529,940. Accordingly, when the weft-detector controlled change-shaft M, is rocked, the follower $j$, through the action of the intervening connections $l, n, o, p, q, r$ and $s$, is shifted into the path of the cam $k$, and the replenishment is effected. After the shuttle thus gets a filled weft-carrier, the spring $g$, restores the shuttle-box to its normal power position, and the spring $m$, restores the follower $j$, to its normal idle position. The position of the cam $k$, on the cam shaft L, insures the proper timing of the weft-replenishment. The follower j, is a laterally shiftable member, and the change shaft M, with the train of devices between it and the shifter o, constitutes a weft-detector controlled mechanism for shifting said member into operative position.

The holder H, is secured to a rock shaft a, (Fig. 5) which is journaled at its opposite ends in bearings on a stout frame N, which is secured to the lay. A spring O, (Fig. 5) acting on this shaft a, and connected with the frame N, maintains the holder H, in its normal position shown in Figs. 2, 5, and 7. Pivoted to the holder are two weft-carrier engaging clips P, and Q, which engage the opposite ends of the spare weft-carrier F, as shown in Fig. 5. Each clip is pressed upon by a spring t, so that both clips yieldingly press upon the weft-carrier. The clip P, is cup-shaped at its holding end so as to securely engage the tip of the weft-carrier. The clip Q, has a projection u, which enters the hollow butt of the weft-carrier to aid in its secure retention. The clip Q, has a projecting heel v, which is in the path of a yielding finger w, on the shuttle-box B, so that when the shuttle-box rises the clip Q, is swung away from the filled weft-carrier in the holder to its release position, thereby releasing the weft-carrier and facilitating its ready transfer to the shuttle. The weft-carrier held by the holder H, is firmly sustained against vertical movement so that it drives downwardly the depleted weft-carrier in the shuttle when the shuttle-box rises, the ejected depleted weft-carrier escaping through the slot c, of the lay.

The clips P, and Q, firmly hold the spare weft-carrier in the holder against the pressure of the weft-carrier detector I. This detector is pivotally connected to a collar fixed to the shaft a, as shown in Fig. 5, and at its upper end it has a sleeve x, through which loosely passes a spring-actuated slide rod R, which is slidingly mounted in guides y, y, on the holder H. This rod R, has a fixed collar z, and is surrounded by two springs S, and T. The expansion spring S, bears against the sleeve x, of the detector and the neighboring guide y, and tends to move the sleeve x, to the left (in Fig. 5) which tendency is resisted by the spare weft-carrier F, held by the clips P, Q. The spring T, by its expansive force keeps the collar z, against the sleeve x, but its expansive force is less than that of the spring S, so that when the detector I, is free to move, the sleeve x, the collar z, and the rod R, are moved to the left (in Fig. 5) by the superior force of the spring S. So long as there is a weft-carrier in the holder H, the detector I, and the spring-actuated slide rod R, are maintained in their inactive positions shown in Fig. 5. But when the spare weft-carrier has been transferred to the shuttle, and the shuttle-box is lowered, the movement of the detector is no longer restrained and the spring S, moves the rod longitudinally toward the left in Fig. 5.

The rod R, at its inner end has a crank arm 10, which has a crank 11, (parallel with rod R) which at its end has a roller head U, (Fig. 3) which constitutes a radially extending member of the holder coöperating with a normally stationary actuator V, (Fig. 2). Under normal conditions (when the weft-carrier detector I, is maintained inactive by a spare weft-carrier in the holder H) the head U, is out of reach of the actuator V. When, however, the spare weft-carrier in the holder is transferred to the shuttle, and the rod R, is moved by the spring S, the member U, is projected to the left and to the position shown in Fig. 3, where the actuator V, is directly in its path. When the lay next swings forward the actuator intercepts the head or member U, and the holder H, is caused to change its position, swinging to the position shown in Figs. 3, and 6.

The crank 11, carrying the head or member U has a bearing in the outer end of a laterally extending arm W, (Figs. 10 and 11) whose inner end is rigidly secured to the inner end of the shaft a, as shown in Figs. 5, and 12, so that the arm W, constitutes a rigid portion of the holder H. Consequently, when the head or member U, encounters the actuator V, the arm W, and with it the holder is swung to the position shown in Figs. 3, and 6. The arm W, has a socket 12, (Fig. 10) in which the head is concealed when in normal idle inactive position.

When the holder has been swung to the position shown in Figs. 3, and 6, the clips P, Q, are in register with the weft-carrier on the shelf G, of the magazine. When the lay then completes its forward beat the clips P, and Q, take a filled weft-carrier from the shelf G, as indicated in Figs. 3, and 6. This forces back the detector I, to its normal inactive position, thereby again putting spring S, under tension, and thereupon spring T, moves rod R, to the right, thus withdrawing the head or member U, from register with the actuator V. When the lay then retreats, the spring O, (Fig. 5), restores the holder H, to its normal position with its freshly obtained spare filled weft-carrier above the shuttle-box B, ready for the next transfer.

A stop arm 13 (Figs. 7, 11, and 12) carried by the arm W, comes in contact with the upper face of the frame N, to maintain the holder H, in definite normal position. An adjustable stop 14, on the arm 13, encounters the top of the frame N, (Figs. 6 and 12) and limits the movement of the holder when it is shifted to its weft-carrier taking position; and by its adjustment enables the holder to be accurately set with respect to the shelf G, of the magazine so as to make correct register therewith.

The holder actuator V, is slidingly and yieldingly mounted on a bracket 15, on the breast beam (Fig. 2), and is pressed rearwardly toward the lay by a spring 16. Accordingly, the actuator can yield after it has intercepted the head or member U, and after the holder has been swung to its weft-carrier taking position so that there is no swing to the holder while its clips are seizing a weft-carrier. Also the actuator can yield in case of an intervening obstacle, such as a misplaced weft-carrier.

The illustrated magazine D, is a vertical hopper holding a stack of spare filled weft-carriers which descend therein by gravity. The lowest of the stack is supported by a shelf G, constituting the bottom of the magazine. This shelf is pivotally hung at 17, to the front of the magazine, (Figs. 3 and 6) and springs 18, hold it yieldingly in place, so that it yields forwardly as the clips engage the shelf-sustained weft-carrier thus rendering the taking of said weft-carrier gentle and easy. Also, the shelf can yield in case there is any inaccuracy in position between it and the holder H, or in the event of an intervening obstacle such as a misplaced weft-carrier. The shelf is trough shaped, as shown in Fig. 6, to assist in retaining the lowest weft-carrier in place. The rear edge of the shelf is sufficiently below the rear wall of the magazine, as shown in Fig. 6, to permit the rearward discharge of the lowest weft-carrier. Endwise movement of the lowest weft-carrier in the shelf is prevented by flanges 19, which engage the weft-carrier head, (Fig. 13) but which do not extend high enough to interfere with the holder clip Q, engaging the head of the weft-carrier on the shelf. A yielding pivoted finger 20, (Figs. 2, and 8) maintained in place by a spring 21, prevents the accidental rearward escape of a weft-carrier on the shelf, but yields when the clips P, Q, have grasped said weft-carrier. The tip of the weft-carrier projects beyond the shelf, as shown in Fig. 8, where it is free to be engaged by the clip P.

When the holder H, occupies its weft-carrier taking position, the clips P, Q, seize the ends of the weft-carrier lying on the shelf, and as the lay retreats, the clips strip said weft-carrier from the shelf, and the subsequent swing of the holder to its normal position brings said weft-carrier to the transferring position on the lay. The stack of weft-carriers in the magazine then drops until the lowest rests on the shelf G.

The magazine has a slot 22, for the outward passage of the weft-ends from the spare weft-carriers. These weft-ends are secured to a stationary weft-end holder X. This weft-end holder is carried by an arm Y, which is adjustably secured by bolt 23, and slot 24, to the base plate 25, on which the magazine is secured. This permits the longitudinal and the angular adjustments of the arm Y, so as to accurately position the holder X, with respect to the shuttle-box B. The holder X, is connected with the arm Y, by a key joint 26 (Fig. 9), so that the holder can be readily attached and detached, thus facilitating the removal of accumulated threads thereon.

A vertical thread guard, consisting of a vertical post Z, on the outer end of the shuttle-box B, on its front side (Figs. 1 and 2), prevents the weft-ends attached to the weft-end holder X, from becoming entangled with the lay or the picker, thus preventing breakage of the weft-ends. Conveniently, and as shown, this post Z, is an upward extension of the pivot-pin of the binder 27.

The complete operation is as follows: When the condition of the weft demands replenishment a weft-detector (of any of the known kinds) detects the need for replenishment and the change-shaft M, is rocked. The rocking of this weft-detector-controlled change-shaft through the intervening devices $p$, $q$, $r$ and $s$, moves the shifter $o$, outwardly, thus bringing the laterally shiftable follower $j$, into the path of the cam $k$. The timing of this weft-detector-controlled mechanism and the cam $k$, is such that the cam acts upon the follower after the shuttle has reached the shuttle-box B. The action of the cam $k$, is to lift the shuttle-box through the intervening instrumentalities K, J, $f$, $e$, $e$. As the shuttle-box is lifted, the depleted weft-carrier within the shuttle encounters the firmly sustained spare weft-carrier grasped by the holder, so that the depleted weft-carrier is ejected downwardly and the spare weft-carrier takes its place within the shuttle. During the rise of the shuttle, the weft-carrier holding-clip Q, is released from the spare weft-carrier by the finger $w$, (Fig. 5), acting upon its projecting heel $v$. Accordingly, when the shuttle-box again drops (under the influence of the spring $g$) the spare weft-carrier is drawn down without the restraint of the clip Q. This rise and fall of the shuttle-box takes place during the forward half of a forward and back beat of the lay, that is to say, during the period that the shuttle occupies the shuttle-box and before it is picked to the other or detecting side of the loom. Hence ample time is afforded for the easy up and down movement of the shuttle-box. On the descent of the shuttle-box with the fresh weft-carrier, the weft-detector I, swings downwardly and the head or member U, of the spring-actuated slide-rod R, is moved into position to be intercepted by the actuator V. This positioning movement of the slide-rod R, cannot take place in season to be effected on the same beat of the lay as that during which the shuttle gets the spare weft-carrier from the holder since the downward movement of the shuttle-box does not take place until the lay is moving backwardly. The timing may be such that the weft-carrier detector I, is free to move while the head or member U, is forward of the rear edge of the actuator V, but, if so, no action will result because the head or member U, would then simply be pressed by the spring S, against the flat outer face of the actuator; and, when the lay in its retreat carried the head of the slide-rod back of the rear edge of the actuator, the spring S, would complete its action and the head member of the slide-rod would then be moved into its actuator-intercepting position. On the next succeeding forward beat of the lay, the projected head member of the slide-rod encounters the actuator V, thereby swinging the holder H, into its weft-carrier taking position. This mechanism for thus moving the holder into weft-carrier taking position acts subsequently to the mechanism which transfers a filled weft-carrier into the shuttle and the timing is such that the holder is supplied with a fresh weft-carrier from the magazine, while the shuttle is at the other or detecting side of the loom. The holder H. is moved into its weft-carrier taking position by the actuator before its clips reach the lowermost weft-carrier resting on the shelf G, of the magazine. During the actual seizing of the fresh weft-carrier by the holder clips, the actuator V, yields forwardly by reason of its sliding yielding mounting. During the completion of this forward movement of the lay the yielding bevel-ended clips P, and Q, of the holder seize the two ends of the fresh weft-carrier lying on the shelf G. The shelf itself is yieldingly mounted, so that it yields as the clips seize the weft-carrier thereon, thus rendering the taking of the weft-carrier gentle and easy. As the clips take the weft-carrier from the magazine shelf the detector I, is moved back to its normal idle position and the spring T, restores the slide-rod R, with its head member U, to its normal inactive position with the member U, out of reach of the actuator V. This retreating movement of the slide-rod R, may not take place concurrently with the restoration of the detector I, to its idle position because of the pressure of the actuator V (under the influence of its spring 16) upon the slide-rod head member U, but if thus prevented from immediate movement the slide-rod will be restored to its normal inactive position as the lay retreats and carries the slide-rod head member beyond reach of the actuator. During this retreat of the lay the spring O, restores the holder H, to its normal position, where it sustains a filled weft-carrier just supplied to it in correct position above the shuttle-box ready for the next transfer. The holder is thus restored to its normal position before the shuttle again returns to the replenishing side of the lay, so that the lay has a spare weft-carrier ready for immediate transfer if occasion demands.

The weft ends extending from the magazine to the weft-end holder during the descent of the weft-carriers in the magazine to the lowermost position on the shelf are apt to become tangled with each other. The holder on the lay in taking the lowermost weft-carrier from the magazine shelf changes the horizontal position of the weft-carrier to such an extent that its weft end is separated from the mass of the ends in the magazine, thus putting the weft end of the weft-carrier in the holder in proper condition for transfer to the running shuttle.

I claim—

1. A weft-replenishing mechanism for looms comprising a lay, a shuttle-box mounted thereon, and a weft-carrier holder mounted on and movable coincidently with said lay and movable upon the lay and away from the shuttle-box to a weft-carrier taking position.

2. A weft-replenishing mechanism for looms comprising a lay, a shuttle-box thereon, a weft-carrier holder mounted on and movable coincidently with said lay and movable upon the lay to a weft-carrier taking position, and weft supply means independent of and disconnected from the lay positioned to deliver weft-carriers to said holder.

3. A weft-replenishing mechanism for looms comprising a lay, a shuttle-box thereon, means for sustaining a weft-carrier at a point toward which the lay moves, and means movable coincidently with said lay for taking a weft-carrier from said sustaining means during one movement of the lay and means for placing said weft-carrier in the shuttle during a subsequent movement of the lay.

4. A weft-replenishing mechanism for looms comprising a lay, a shuttle-box thereon, a weft-carrier holder movable coincidently with the lay and movable upon the lay to a weft-carrier taking position, and coöperating means normally held inoperative by the presence of a weft-carrier in said holder for moving said holder to the weft-carrier taking position.

5. A weft-replenishing mechanism for looms comprising a lay, a shuttle-box thereon, a holder for a weft-carrier holding it in position to be placed in said shuttle during the movement of said lay, a detector for detecting the absence of a weft-carrier from said holder, and means governed by said detector to supply said holder with weft-carriers.

6. A weft-replenishing mechanism for looms comprising a lay, a shuttle-box thereon, a weft-carrier holder mounted on said lay and having means for engaging the ends of a weft-carrier, a detector movable with respect to said holder and adapted to be held in retracted position by a weft-carrier in said holder, and means governed by said detector to supply said holder with weft-carriers.

7. A weft-replenishing mechanism for looms comprising a lay, a shuttle-box thereon, a weft-carrier holder movably mounted on said lay, means coöperating with a member of said holder for effecting the movement of the holder to a weft-carrier taking position and a detector controlled by the presence of a weft-carrier in said holder for normally holding said member in the inoperative position.

8. A weft-replenishing mechanism for looms comprising a lay, a shuttle-box movably mounted thereon, a weft-carrier holder mounted on said lay near said shuttle-box, and means for moving the shuttle-box toward said holder to effect the placing of a weft-carrier held by said holder in the shuttle.

9. A weft-replenishing mechanism for looms comprising a lay, a shuttle-box movably mounted thereon, means for moving said box upward, a holder mounted on said lay and located above said shuttle-box, weft-carrier engaging clips on said holder and means for moving one of said clips to the release position.

10. A weft-replenishing mechanism for looms comprising a lay, a shuttle-box movably mounted thereon, a weft-carrier holder movable coincidently with the lay, and means for moving said shuttle-box relatively to said holder comprising coöperating mechanism including a shiftable member, and a weft-detector controlled mechanism for shifting said member into operative position.

11. A weft-replenishing mechanism for looms comprising a lay, a shuttle-box movably mounted thereon, a weft-carrier holder movable coincidently with the lay, means for moving said shuttle-box relative to said holder comprising coöperative mechanism including a shiftable follower and a cam, and a weft-detector controlled mechanism having a shifter engaged with said follower for moving said follower into the path of said cam when replenishment is required.

12. A weft-replenishing mechanism for looms comprising weft-carrier supporting means, a lay movable with respect to such means, and a weft-carrier holder movable coincidently with said lay and adapted to take a weft-carrier from such weft-carrier supporting means and to sustain said weft-carrier above said lay.

13. A weft-replenishing mechanism for looms comprising means for supporting a series of weft-carriers, a lay movable with respect to such means, a shuttle-box on said lay, and means carried by said lay for taking a weft-carrier from said weft-carrier support and sustaining it above said shuttle.

14. A weft-replenishing mechanism for looms comprising a weft-carrier support, a lay movable with respect to such support, a shuttle-box on the lay, a weft-carrier holder pivotally mounted above said lay and movable therewith, and means for intercepting a member of said weft-carrier holder, to swing said holder to the weft-carrier taking position.

15. A weft-replenishing mechanism for looms comprising a weft-carrier support, a lay movable with respect to such support, a shuttle-box on the lay, a weft-carrier holder pivotally mounted above the shuttle position on said lay and having a radially extending member, and means for intercepting said member during the movement of the lay to swing said holder to the weft-carrier taking position.

16. A weft-replenishing mechanism for looms comprising a weft-carrier support, a lay movable with respect to such support, a shuttle-box on said lay, a holder pivotally mounted above said shuttle-box and having weft-carrier engaging means, a member movably mounted on said holder, means controlled by a weft-carrier in said frame for projecting said member to an operative position, and means positioned to intercept said member, when projected, under the movement of said lay.

17. A weft-replenishing mechanism for looms comprising the breast-beam, a magazine mounted thereon and having a yielding shelf for one of the weft-carriers carried by the magazine, an actuator mounted on said breast-beam, the lay movable toward said breast-beam, and a weft-carrier holder movably mounted on said lay and having a member adapted to be acted upon by said actuator to move said weft-carrier holder to the weft-carrier taking position.

18. A weft-replenishing mechanism for looms comprising the breast-beam, a magazine mounted thereon and having a yielding weft-carrier shelf, a yielding actuator slidingly mounted adjacent said magazine, the lay movable toward said breast-beam, a weft-carrier holder movably mounted on the lay and having a member adapted to be acted upon by said actuator, and means for limiting the movement of said weft-carrier holder whereby during the forward movement of the lay, said weft-carrier holder is moved to the weft-carrier taking position and is then carried forward to take a weft-carrier from such weft-carrier support.

19. A weft-replenishing mechanism for looms comprising the lay, a shuttle-box movably mounted on the lay, a holder mounted to swing above said shuttle-box and having a laterally extending arm, a spring actuated slide rod extending through a bearing in said arm, a detector mounted in said holder and acting when retracted to restrain the sliding of said rod, means carried by said holder for sustaining a weft-carrier in position to hold said detector in the retracted position, and an actuator positioned to engage said slide rod when said rod is projected and, due to the relative movement of of said lay and said actuator, effects the swinging of said holder.

20. A weft-replenishing mechanism for looms comprising the lay, a shuttle-box movably mounted thereon, and means for moving said shuttle-box vertically, of a holder mounted on said lay having weft-carrier sustaining clips located above said shuttle-box, and coöperating means for moving one of said weft-carrier sustaining clips to the open position.

21. A weft-replenishing mechanism for looms comprising the lay, a shuttle-box movably mounted thereon and means for moving said shuttle-box vertically, of a holder mounted above the shuttle-box, a pair of spring actuated weft-carrier holding clips on said holder, and coöperating means on one of said clips and on said shuttle-box for effecting release movement of said clip under relative movement of said shuttle-box and said holder.

22. A weft-replenishing loom, comprising a lay, a shuttle-box mounted on said lay, a weft-carrier holder mounted to move coincidently with the lay and adapted to sustain a weft-carrier above said shuttle, and mechanism for effecting an upward movement of the shuttle-box and its shuttle whereby the weft-carrier sustained by said holder may enter said shuttle and force the depleted weft-carrier therefrom.

23. A weft-replenishing loom having, in combination, a lay; a magazine mounted on a stationary support and containing filled weft-carriers; a vertically movable shuttle-box on the lay at the magazine side of the loom, automatic means, operative when weft-replenishment is called for, to raise and lower said shuttle-box when holding the shuttle containing a depleted weft-carrier; a weft-carrier holder pivotally mounted on the lay which holds a filled weft-carrier in position above said shuttle-box, whereby, when said shuttle-box is lifted, the weft-carrier held by said holder is transferred to the shuttle and the depleted weft-carrier is ejected downwardly; a detector on said holder which is maintained inactive by a weft-carrier held by said holder but which is moved into active position when there is no weft-carrier in said holder; and mechanism coöperating with said holder when said detector is active which causes said holder to swing upwardly and to take a weft-carrier from the magazine on a succeeding beat of the lay following the transfer of a filled weft-carrier to the shuttle.

24. A weft-replenishing loom having, in combination, a lay; a magazine mounted on a stationary support and containing filled weft-carriers; a movable shuttle-box on the lay at the magazine side of the loom; automatic means, operative when weft-replenishment is called for, to move said shuttle-box when holding the shuttle containing a depleted weft-carrier; a weft-carrier holder mounted on the lay which holds a filled weft-carrier in position with respect to said shuttle-box, whereby, when said shuttle-box is moved, the weft-carrier held by said holder is transferred to the shuttle and the depleted weft-carrier is ejected; a detector which is maintained inactive by a weft-carrier held by said holder but which is moved into active position when there is no weft-carrier in said holder; and mechanism coöperating with said holder when said detector is active which causes said holder to change position and to take a weft-carrier from the magazine on a succeeding beat of the lay following the transfer of a filled weft-carrier to the shuttle.

25. A weft-replenishing loom having, in combination, a lay; a magazine mounted on a stationary support and containing filled weft-carriers; a movable shuttle-box on the lay at the magazine side of the loom; automatic means, operative when weft-replenishment is called for, to move said shuttle-box when holding the shuttle containing a depleted weft-carrier; a weft-carrier holder which holds a filled weft-carrier in position with respect to said shuttle-box, whereby, when said shuttle-box is moved, the weft-carrier held by said holder is transferred to the shuttle and the depleted weft-carrier is ejected; a detector which is maintained inactive by a weft-carrier held by said holder but which is moved into active position when a weft-carrier is transferred from said holder to the shuttle; and mechanism coöperating with said holder when said detector is active which causes said holder to take a weft-carrier from the magazine on a succeeding beat of the lay following the transfer of a filled weft-carrier to the shuttle.

26. A weft-replenishing loom having, in combination, a lay; a magazine containing filled weft-carriers; a movable shuttle-box on the lay; automatic means, operative when weft-replenishment is called for, to move said shuttle-box when holding the shuttle containing a depleted weft-carrier, a weft-carrier holder which holds a filled weft-carrier, whereby, when said shuttle-box is moved the weft-carrier held by said holder is transferred to the shuttle and the depleted weft-carrier is ejected; a detector which is maintained inactive by a weft-carrier held by said holder but which is moved into active position when a weft-carrier is transferred from said holder to the shuttle; and mechanism coöperating with said holder when said detector is active which causes said holder to take a weft-carrier from the magazine on a succeeding beat of the lay following the transfer of a filled weft-carrier to the shuttle.

27. A weft-replenishing loom having, in combination, a lay; a magazine containing filled weft-carriers; a movable shuttle-box on the lay; automatic means, operative when weft-replenishment is called for, to move said shuttle-box when holding the shuttle containing a depleted weft-carrier; a weft-carrier holder which holds a filled weft-carrier, whereby, when said shuttle-box is moved, the weft-carrier held by said holder is transferred to the shuttle and the depleted weft-carrier is ejected; and subsequently acting mechanism coöperating with said holder when a weft-carrier has been transferred therefrom to the shuttle which causes said holder to take a weft-carrier from the magazine on a succeeding beat of the lay following the transfer of a filled weft-carrier to the shuttle.

28. A weft-replenishing loom having, in combination, a lay; a magazine containing filled weft-carriers; a movable shuttle-box on the lay; automatic means, operative when weft-replenishment is called for, to move said shuttle-box when holding the shuttle containing a depleted weft-carrier; a weft-carrier holder which holds a filled weft-carrier, whereby, when said shuttle-box is moved, the weft-carrier held by said holder is transferred to the shuttle and the depleted weft-carrier is ejected; and mechanism coöperating with said holder when a weft-carrier has been transferred therefrom to the shuttle which causes said holder to take a weft-carrier from the magazine.

29. A weft-replenishing loom having, in combination, a lay with its shuttle boxes; a magazine mounted on a stationary support and containing filled weft-carriers; a weft-carrier holder mounted on the lay which holds a filled weft-carrier in position with respect to one of the shuttle-boxes; automatic means, operative when weft-replenishment is called for, to cause a relative movement between said holder and the neighboring shuttle-box when holding the shuttle containing a depleted weft-carrier, whereby the weft-carrier held by said holder is transferred to the shuttle and the depleted weft-carrier is ejected; a detector which is maintained inactive by a weft-carrier held by said holder but which is moved into active position when a weft-carrier is transferred from said holder to the shuttle; and mechanism coöperating with said holder when said detector is active which causes said holder to change position and to take a weft-carrier from the magazine on a succeeding beat of the lay following the transfer of a filled weft-carrier to the shuttle.

30. A weft-replenishing loom having, in combination, a lay with its shuttle-boxes; a magazine mounted on a stationary support and containing filled weft-carriers; a weft-carrier holder mounted on the lay which holds a filled weft-carrier in position with respect to one of the shuttle-boxes; automatic means, operative when weft-replenishment is called for, to cause a relative movement between said holder and the neighboring shuttle-box when holding the shuttle containing a depleted weft-carrier, whereby the weft-carrier held by said holder is transferred to the shuttle and the depleted weft-carrier is ejected; and subsequently acting mechanism coöperating with said holder which causes said holder to change position and to take a weft-carrier from the magazine on a succeeding beat of the lay following the transfer of a filled weft-carrier to the shuttle.

31. A weft-replenishing loom having, in combination, a lay with its shuttle-boxes; a magazine containing filled weft-carriers; a weft-carrier holder which holds a filled weft-carrier in position with respect to one of the shuttle-boxes; automatic means, operative when weft-replenishment is called for, to cause a relative movement between said holder and the neighboring shuttle-box when holding the shuttle containing a depleted weft-carrier, whereby the weft-carrier held by said holder is transferred to the shuttle; and subsequently acting mechanism coöperating with said holder which causes said holder to take a weft-carrier from the magazine on a succeeding beat of the lay following the transfer of a filled weft-carrier to the shuttle.

32. A weft-replenishing loom having, in combination, a lay with its shuttle-boxes; a magazine mounted on a stationary support and containing filled weft-carriers; a weft-carrier holder mounted on the lay which holds a filled weft-carrier in position with respect to one of the shuttle-boxes; automatic means, operative when weft-replenishment is called for, to cause a relative movement between said holder and the neighboring shuttle-box when holding the shuttle containing a depleted weft-carrier, whereby the weft-carrier held by said holder is transferred to the shuttle and the depleted weft-carrier is ejected; and meachanism coöperating with said holder which causes said holder to take a weft-carrier from the magazine after the transfer of a filled weft-carrier to the shuttle.

33. A weft-replenishing loom having, in combination, a lay with its shuttle-boxes; a magazine containing filled weft-carriers; a weft-carrier holder mounted on the lay which holds a filled weft-carrier in position with respect to one of the shuttle-boxes; automatic means, operative when weft-replenishment is called for, to cause a relative movement between said holder and the neighboring shuttle-box when holding the shuttle containing a depleted weft-carrier, whereby the weft-carrier held by said holder is transferred to the shuttle; and mechanism coöperating with said holder which causes said holder to take a weft-carrier from the magazine after the transfer of a filled weft-carrier to the shuttle.

34. A weft-replenishing loom having, in combination, a lay with its shuttle-boxes; a magazine containing filled weft-carriers; a weft-carrier holder mounted on the lay which holds a filled weft-carrier in position with respect to the neighboring shuttle-box and takes a weft-carrier from the magazine on a succeeding beat of the lay following the transfer of the filled weft-carrier from it to the shuttle; and automatic means, operative when weft-replenishment is called for, to transfer the filled weft-carrier from said holder to the shuttle.

35. A weft-replenishing loom having, in combination, a lay with its shuttle-boxes; a magazine containing filled weft-carriers; a weft-carrier holder mounted on the lay which holds a filled weft-carrier in position with respect to the neighboring shuttle-box, and takes a weft-carrier from the magazine after the transfer of the filled weft-carrier from it to the shuttle; and automatic means, operative when weft-replenishment is called for, to transfer the filled weft-carrier from said holder to the shuttle.

36. A weft-replenishing loom having, in combination, a lay with its shuttle-boxes; a magazine containing filled weft-carriers; a weft-carrier holder which holds a filled weft-carrier in position with respect to one of the shuttle-boxes, and is timed to take a weft-carrier from the magazine on a succeeding beat of the lay following the transfer of the filled weft-carrier from it to the shuttle; and automatic means, operative when weft-replenishment is called for, to transfer the filled weft carrier from said holder to the shuttle.

37. A weft-replenishing loom having, in combination, a lay with its shuttle-boxes; a magazine containing filled weft-carriers; a weft-carrier holder which holds a filled weft-carrier in position with respect to one of the shuttle-boxes, and takes a weft-carrier from the magazine after the transfer of the filled weft-carrier from it to the shuttle; and automatic means, operative when weft-replenishment is called for, to transfer the filled weft-carrier from said holder to the shuttle.

38. A weft-replenishing loom having, in combination, a lay having shuttle-boxes; a magazine containing filled weft-carriers; a weft-carrier holder mounted on the lay which holds a filled weft-carrier in position with respect to one of the shuttle-boxes and is supplied with a weft-carrier from the magazine on a succeeding beat of the lay following the transfer of a filled weft-carrier from it to the shuttle; and automatic means, operative when weft-replenishment is called for, to transfer the filled weft-carrier from said holder to the shuttle.

39. A weft-replenishing loom having, in combination, a lay with its shuttle-boxes; a magazine containing filled weft-carriers; a weft-carrier holder which holds a filled weft-carrier in position with respect to one of the shuttle-boxes and is supplied with a weft-carrier from the magazine on a succeeding beat of the lay following the transfer of a filled weft-carrier from it to the shuttle; and automatic means, operative when weft-replenishment is called for, to transfer the filled weft-carrier from said holder to the shuttle.

40. A weft-replenishing loom having, in combination, a lay with its shuttle-boxes; a magazine independent of the lay containing filled weft-carriers; a weft-carrier holder mounted on the lay which holds a filled weft-carrier in position with respect to one of the shuttle-boxes and is supplied with a weft-carrier from the magazine after the transfer of a filled weft-carrier from it to the shuttle; and automatic means, operative when weft-replenishment is called for, to transfer the filled weft-carrier from said holder to the shuttle.

41. A weft-replenishing loom having, in combination, a lay with its shuttle-boxes; a magazine containing filled weft-carriers; a weft-carrier holder which holds a filled weft-carrier in position with respect to one of the shuttle-boxes; automatic means, operative when weft-replenishment is called for, to transfer the weft-carrier held by said holder to the shuttle; a detector which is maintained inactive by a weft-carrier held by said holder but which is moved into active position when a weft-carrier is transferred from said holder to the shuttle; and mechanism coöperating with said holder when said detector is active which causes said holder to take a weft-carrier from the magazine.

42. A weft-replenishing loom having, in combination, a lay; a magazine containing filled weft-carriers; a movable shuttle-box on the lay; automatic means, operative when weft-replenishment is called for, to raise and lower said shuttle-box when holding the shuttle containing a depleted weft-carrier; a weft-carrier holder mounted on the lay which holds a filled weft-carrier in position with respect to said shuttle-box, whereby, when said shuttle-box is moved the weft-carrier held by said holder is transferred to the shuttle and the depleted weft-carrier is ejected; and subsequently acting mechanism coöperating with said holder which causes said holder to take a weft-carrier from the magazine on a succeeding beat of the lay following the transfer of a filled weft-carrier to the shuttle.

43. An automatic weft-replenishing loom having, in combination, a lay; a magazine containing filled weft-carriers; a movable shuttle-box on the lay; automatic means, operative when weft-replenishment is called for, to raise and lower said shuttle-box when holding the shuttle containing a depleted weft-carrier; a weft-carrier holder mounted on the lay which holds a filled weft-carrier in position with respect to said shuttle-box, whereby, when said shuttle-box is moved the weft-carrier held by said holder is transferred to the shuttle and the depleted weft-carrier is ejected; and mechanism coöperating with said holder when a weft-carrier has been transferred therefrom to the shuttle which causes said holder to take a weft-carrier from the magazine.

44. A weft-replenishing loom having, in combination, a lay; a magazine independent of the lay; and mechanisms disconnected and separate from the magazine for taking weft-carriers from the magazine and for transferring weft-carriers while moving with the lay from the lay to the shuttle carried thereby and for transferring weft-carriers from the magazine to the lay.

45. A weft-replenishing loom having, in combination, a lay; a magazine independent of the lay; mechanism for transferring weft-carriers from the lay to the shuttle carried thereby; and subsequently acting mechanism for transferring weft-carriers from the magazine to the lay, the transfer from the magazine to the lay occurring at a beat of the lay succeeding the transfer of a weft-carrier from the lay to the shuttle.

46. A weft-replenishing loom having, in combination, a lay, a magazine independent of the lay; and mechanism for transferring weft-carriers from the lay to the shuttle carried thereby; and subsequently acting mechanism for transferring weft-carriers from the magazine to the lay timed so that the transfer from the lay to the shuttle occurs at one beat of the lay and the transfer from the magazine to the lay occurs at a succeeding beat of the lay and before the shuttle again reaches the transfer position.

47. A weft-replenishing loom having, in combination, a lay; a magazine independent of the lay; a weft-carrier holder mounted and movable on the lay; and a yielding actuator which intercepts a member of said holder to move said holder into position to be supplied with a weft-carrier from the magazine.

48. A weft-replenishing loom having, in combination, a lay; a magazine independent of the lay; a yielding shelf constituting a portion of said magazine and adapted to hold a weft-carrier in readiness for transfer to the lay, said shelf supporting a weft-carrier with both of its ends exposed; and a weft-carrier holder on the lay having yielding bevel ended clips which engage the two ends of the weft-carrier supported by said shuttle for the purpose of transferring said weft-carrier to the lay.

49. A weft-replenishing loom having, in combination, a lay; a magazine independent of the lay; a yielding shelf constituting a portion of said magazine and adapted to hold a weft-carrier in readiness for transfer to the lay; and a weft-carrier holder on the lay which takes the weft-carrier supported by said shelf and transfers it to the lay.

50. A weft-replenishing loom having a magazine with a weft-carrier supporting shelf, said shelf supporting the weft-carrier with both of its ends exposed and having means at one end to prevent endwise displacement of the supported weft-carrier in both directions and having a yielding finger to prevent accidental escape of the supported weft-carrier.

51. A weft-replenishing loom having a magazine with a weft-carrier supporting shelf, said shelf supporting the weft-carrier with both of its ends exposed and having means to prevent endwise displacement of the supported weft-carrier in both directions.

52. A weft-replenishing loom having, in combination, a magazine independent of the lay; a holder for a spare weft-carrier mounted on the lay; a weft-end holder independent of the lay which holds onto the ends of the weft-threads of all of the spare weft-carriers; and a vertically extending thread guard carried by the lay and operatively located between the weft-end holder and the holder on the lay which prevents the breaking of the weft ends by the moving parts of the loom.

53. A weft-replenishing loom having, in combination, a magazine independent of the lay; a holder for a spare weft-carrier mounted on the lay; a weft-end holder independent of the lay which holds onto the ends of the weft-threads of all of the spare weft-carriers; and a thread guard carried by the lay and operatively located between the weft-end holder and the holder on the lay which prevents the breaking of the weft-ends by the moving parts of the loom.

54. A weft-replenishing loom having, in combination, a lay; a magazine independent of and disconnected from the lay; and mechanism which gets a weft-carrier from the magazine and, while carrying the weft-carrier and moving with the lay, transfers the weft-carrier to the shuttle carried by the lay.

55. A weft-replenishing loom having, in combination, a lay; a magazine independent of the lay; a weft-carrier holder mounted on the lay; and mechanisms for transferring weft-carriers from the holder to the shuttle carried by the lay and for transferring weft-carriers from the magazine to said holder.

56. A weft-replenishing loom having, in combination, a lay; a magazine independent of the lay; a weft-carrier holder mounted on the lay; mechanism for transferring weft-carriers from said holder to the shuttle carried by the lay; and subsequently acting mechanism for transferring weft-carriers from the magazine to said holder, the transfer from the magazine to the holder occurring at a beat of the lay succeeding the transfer of a weft-carrier from the holder to the shuttle.

57. A weft-replenishing loom having, in combination, a lay; a magazine independent of the lay; a weft-carrier holder mounted on the lay; mechanism for transferring weft-carriers from the holder to the shuttle carried by the lay; and subsequently acting mechanism for transferring weft-carriers from the magazine to the holder timed so that the transfer from the holder to the shuttle occurs at one beat of the lay and the transfer from the magazine to the holder occurs at a succeeding beat of the lay and before the shuttle again reaches the transfer position.

58. A weft-replenishing loom having, in combination, a lay; means, independent of the lay, for sustaining weft-carriers; a weft-carrier holder normally occupying a predetermined position relative to the shuttle box; means for removing the weft-carrier from said holder and transferring it to the shuttle; and means for causing said holder to withdraw another weft-carrier from said weft-carrier sustaining means and for maintaining said holder in normal position on the lay.

59. A weft-replenishing loom having, in combination, a magazine and weft-end holder independent of the lay, and means for separating the weft-end of the weft-carrier next to be transferred to the running shuttle from the mass of ends of the weft-carriers in the magazine, said means consisting of a weft-carrier holder mounted on and moving with the lay and holding the weft-carrier next to be transferred to the running shuttle.

In witness whereof, I have hereunto signed my name in the presence of two subscribing witnesses.

EUGENE H. BALLOU.

Witnesses:
 FRANK J. DUTCHER,
 FRED F. HALLEDAY, Jr.